(12) United States Patent
Ross

(10) Patent No.: US 12,744,371 B2
(45) Date of Patent: Sep. 22, 2026

(54) ADAPTIVE COMMUTATION HYBRID CIRCUIT BREAKER

(71) Applicant: Schweitzer Engineering Laboratories, Inc., Pullman, WA (US)

(72) Inventor: Brett A. Ross, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 201 days.

(21) Appl. No.: 18/745,210

(22) Filed: Jun. 17, 2024

(65) Prior Publication Data

US 2025/0385508 A1 Dec. 18, 2025

(51) Int. Cl.
*H02H 3/087* (2006.01)
*H02H 1/00* (2006.01)
*H02H 3/44* (2006.01)

(52) U.S. Cl.
CPC .......... *H02H 3/087* (2013.01); *H02H 1/0007* (2013.01); *H02H 1/0038* (2013.01); *H02H 3/445* (2013.01)

(58) Field of Classification Search
CPC ...... H02H 1/007; H02H 1/0038; H02H 3/087; H02H 3/445; H02H 1/0007
USPC .......... 361/93.9
See application file for complete search history.

(56) References Cited

U.S. PATENT DOCUMENTS

2007/0121257 A1* 5/2007 Maitra .................. H01H 9/542 361/2
2016/0203932 A1* 7/2016 Niehoff ................ H01H 47/223 361/170
2021/0203149 A1* 7/2021 Askan .................. H01H 9/542
2023/0344212 A1* 10/2023 Jimenez ................ H01H 71/04

OTHER PUBLICATIONS

Callavik, Mangus; Blomberg, Anders; Hafner, Jurgen; Jacobson, Bjorn: “The Hybrid HVDC Breaker—An Innovation Breakthrough Enabling Reliable HVDC Grids” ABB Grid Systems, Technical Paper Nov. 2012.

Fuji Electric Innovating Energy Technology, For Electric Railway Substations, “Fuji Electric DC High-speed Vacuum Circuit Breaker”, 2013.

(Continued)

*Primary Examiner* — Kevin J Comber
(74) *Attorney, Agent, or Firm* — Fletcher Yoder, P.C.

(57) ABSTRACT

A current interruption system may include an electromechanical switch coupling an electrical source and an electrical load along an electrical line of a power delivery system. The current interruption system may also include a controller that may receive an indication of an electrical characteristic along the electrical line, determine a fault condition based on the electrical characteristic, and transmit instructions to interrupt a first current through the electromechanical switch according to a first mode or second mode based on the electrical characteristic and the determination of the fault condition. Additionally, the current interruption system may include a voltage source converter (VSC) that may receive the instructions from the controller, interrupt the first current according to the first mode or the second mode, and reduce a second current through the VSC to zero.

20 Claims, 13 Drawing Sheets

(56) References Cited

OTHER PUBLICATIONS

Liu, Jian; Ravi, Lakshmi; Dong, Dong; Burgos, Ronaldo; Buttay, Cyril; Schmalz, Steve: "High Power Density Design of Power Electronic Interrupter in Hybrid DC Circuit Breaker" 2021 IEEE Applied Power Electronics Conference and Exposition (APEC), 2021.

Miyara, Ryo; Nakadomari, Akito; Matayoshi, Hidehito; Takahashi, Hiroshi; Hemeida, Ashraf M.; Senjyu, Tomonobu: "A Resonant Hybrid DC Circuit Breaker for Multi-Terminal HVDC Systems" Sustainability 2020.

Scibreak: "Concept VSC Assisted Resonant Current (VARC) Circuit Breaker (CB)" https://scibreak.com/technology/concept. 2022, Accessed on Jun. 26, 2024.

* cited by examiner

VSC
VACCUM CONTACTOR
VACUUM INTERRUPTER
CHOKE
[I_CAP]
[I_MOV]
[V_DC]
[MODE_IDR]
[FAULT]
[V_VSC]
[I_VSC]
[G]
OR
[CNT_CLS]
[I_VAC]

ADAPTIVE COMMUTATION HYBRID CIRCUIT BREAKER

BACKGROUND

This disclosure relates to systems and methods for efficiently interrupting current flow to protect direct-current (DC) power delivery systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power delivery systems carry electricity from a transmission system to residential communities, factories, industrial areas, and other electricity consumers. An electric power delivery system may include protection devices, such as circuit breakers that open and close to interrupt electric power delivery in response to electrical measurements of the electric power delivery system. Circuit breakers in alternating-current (AC) electric power delivery systems may rely on sinusoidal properties of the alternating current to interrupt power delivery. However, interrupting power delivery in DC power delivery systems may challenging, and circuit breakers in DC power delivery systems may have a narrow range or capability, may be cumbersome, and may include numerous complex components.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

Figure 1:
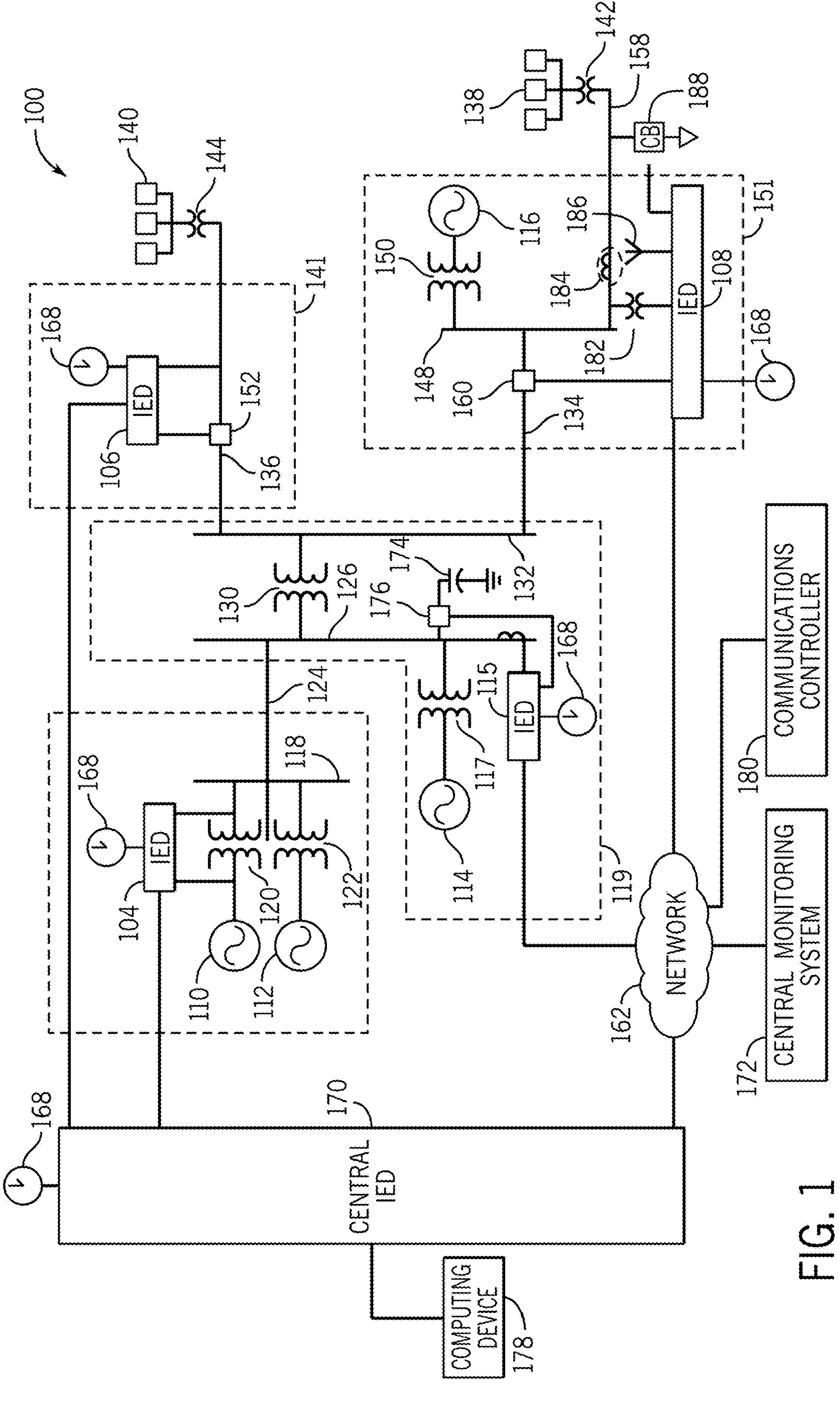
FIG. 1 is a schematic diagram of an electric power delivery system.

Turning to the drawings, FIG. 1 is a schematic diagram of an electric power distribution system 100 that may generate, transmit, and/or distribute electric energy to various loads (e.g., different structures). The electric power distribution system 100 may use various IEDs 104, 106, 108, 115 to control certain aspects of the electric power distribution system 100. As used herein, an IED (e.g., the IEDs 104, 106, 108, 115) may refer to any processing-based device that monitors, controls, automates, and/or protects monitored equipment within the electric power distribution system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power distribution system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power distribution system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power distribution system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power distribution system 100 using a communications network 162 and/or using a common time source, such as a Global Navigation Satellite System ("GNSS"), or the like.

The IEDs 104, 106, 108, 115 may be used for controlling various other equipment of the electric power distribution system 100. By way of example, the illustrated electric power distribution system 100 includes electric generators 110, 112, 114, 116 and power transformers 117, 120, 122, 130, 142, 144, 150. The electric power distribution system 100 may also include electric power lines 124, 134, 136, 158 and/or busses 118, 126, 132, 148 to transmit and/or deliver power, adaptive-commutation hybrid circuit breakers (AC HCBs) 152, 160, 176 to control flow of power in the electric power distribution system 100, and/or loads 138, 140 to receive the power in and/or from the electric power distribution system 100. A variety of other types of equipment may also be included in electric power distribution system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the distribution bus 132 via the power transformer 130 (e.g., a step-down transformer). Various electric power lines 136, 134 may be connected to the distribution bus 132. The electric power line 136 may lead to a substation 141 in which the electric power line 136 is monitored and/or controlled using the IED 106, which may selectively open and close the AC HCB 152. The load 140 may be fed from the electric power line 136, and the power transformer 144 (e.g., a step-down transformer) in communication with the distribution bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The AC HCB 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A central IED 170 may be in communication with the IEDs 104, 106, 108, 115. The IEDs 104, 106, 108, 115 may be remote from the central IED 170 and may communicate over various media. For instance, the central IED 170 may be directly in communication with the IEDs 104, 106 and may be in communication with the IEDs 108, 115 via the communications network 162.

The central IED 170 may enable or block data flow between any of the IEDs 104, 106, 108, 115. For example, during operation of the electric power distribution system 100, the IEDs 104, 106, 108, 115 may transmit data with one another to perform various functionalities for the electric power distribution system 100 by initially transmitting the data to the central IED 170. The central IED 170 may receive the data and may subsequently transmit the data to an intended recipient of the data. The central IED 170 may also control data flow between one of the IEDs 104, 106, 108, 115 and another device communicatively coupled to the central IED 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power distribution system 100 via the central IED 170 and/or to send data, such as a user input, to the electric power distribution system 100 via the central IED 170. Thus, the central IED 170 may enable or block operation of the electric power distribution system 100 via the computing device 178.

A communications controller 180 may interface with equipment in the communications network 162 to create an SDN that facilitates communication between the central IED 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the central IED 170 to instruct the central IED 170 to transmit certain data (e.g., data associated with a certain set of characteristics or information) to a particular destination (e.g., an intended recipient) using flows, matches, and actions defined by the communications controller 180.

It may be desirable to quickly interrupt electrical flow at one or more points of the electric power distribution system 100 to protect certain components (e.g., the loads 138, 140) of the power distribution system 100. For example, it may be desirable to interrupt an overcurrent event along the power line 136 to protect the load 140 in response to detection of the overcurrent event by the IED 106, for instance. Further, in some cases, the power distribution system 100 may include or be part of low voltage applications (e.g., transportation settings), medium voltage applications (e.g., renewable energy systems), or high voltage applications (e.g., industrial systems). Additionally, it may be desirable for current-interrupting devices to have a reduced form factor and have fewer and less complex components. Thus, embodiments of the present disclosure are directed to an improved circuit breaker that performs quickly and efficiently in a wide range of applications, utilizes robust control structures, and includes fewer components. The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Figure 2:
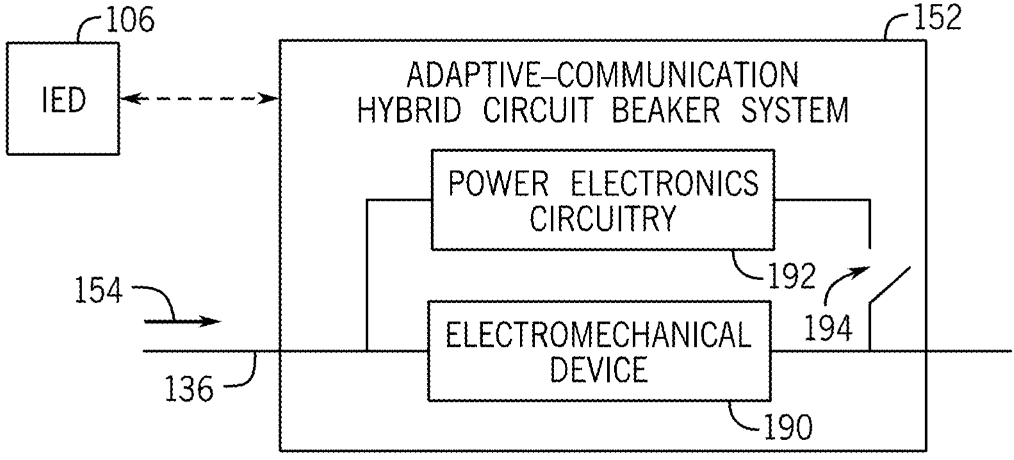
FIG. 2 is a block diagram of an adaptive-commutation hybrid circuit breaker (AC HCB) of the electric power delivery system.

FIG. 2 is a schematic block diagram of the adaptive-commutation hybrid circuit breaker (AC HCB) 152 of FIG. 1, including an electromechanical device 190 and power electronics circuitry 192. As mentioned above, the AC HCB 152 may be communicatively coupled to the IED 106, and the IED 106 may monitor and control the AC HCB 152 and/or the electric power line 136. The AC HCB 152 may, for example, include one or more sensors (e.g., current sensors, voltage sensors) that generate sensor data that is transmitted to the IED 106. It should be noted that while the IED 106 is described as determining an anomalous electrical condition (e.g., fault condition), in some examples, determination of anomalous conditions and other analyses may be performed by the AC HCB 152 (e.g., a controller included as part of the AC HCB 152) or by another controller communicatively coupled to the AC HCB 152.

The electromechanical device 190 may be configured to open and close based on instructions from the IED 106 and may be arranged on the path by which current flows during normal operation (e.g., while current is being delivered to a connected load). The electromechanical device 190 may, as described herein, include a vacuum interrupter (VI) that may conduct electrical flow in a direction 154 along an electric power line 136 during normal operation and may disconnect electrical contacts of the electric power line 136 to cause an interruption of electrical flow upon instructions from, for example, the IED 106. As such, the VI may act as a switch that remains closed during normal operation and that opens when an anomalous electrical condition is detected. The IED 106 may determine an overcurrent condition or other anomalous electrical condition based on the sensor data and may, in response, instruct the electromechanical device 190 to interrupt a current flow (e.g., open), thereby interrupting a current flow 154 from a reaching a connected load.

The IED 106 may also, in response to detecting an anomalous electrical condition, cause a switch 194 to close, thereby connecting the electric power line 136 to the power electronics circuitry 192. The switch 194, as described herein, may include a vacuum contactor (VC) or other suitable switching mechanism suitable for wide ranges of electrical applications. The power electronics circuitry 192, when connected to the electric power line 136, may serve to reduce (e.g., short-circuit) a current of the electromechanical device 190 to reduce electrical stresses induced on electromechanical device 190 when mitigating an anomalous electrical condition. As such, the power electronics circuitry 192 may complete an interruption (e.g., circuit break) of the electrical flow 136 such that anomalous electrical conditions may be prevented from impacting a load connected to the electric power line 136. The power electronics circuitry 192 may, as will be described herein, a voltage source convertor (VSC) and various other components useful in efficiently extinguishing an arc and completing a circuit breaking process.

Figure 3:
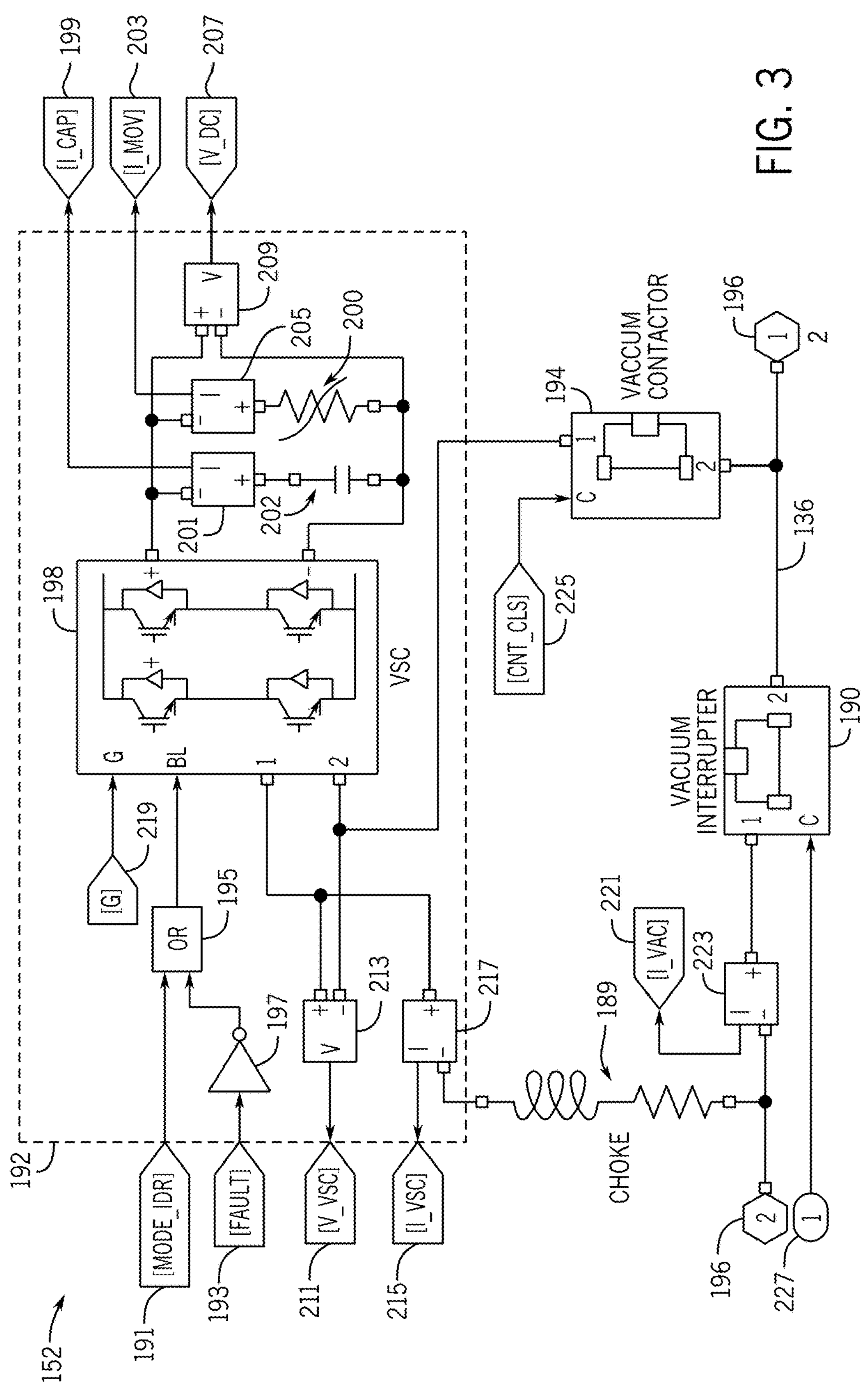
FIG. 3 is a schematic diagram of circuitry of the adaptive-commutation hybrid circuit breaker (AC HCB)

FIG. 3 is a schematic diagram of logic and electrical circuitry of the AC HCB 152 of FIGS. 1-2. As mentioned, the AC HCB 152 may include the electromechanical device 190, here illustrated as a vacuum interrupter (VI), arranged on the electrical line 136. The VI 190 may also accept an input (e.g., constant input) 227. Additionally, the AC HCB 152 may include output terminals 196 along the electrical line 136 to interface with, for example, devices of the electrical power distribution system 100, such as electrical loads, electrical power sources, and the like. As illustrated, the power electronics circuitry 192 may be electrically coupled to the electrical power line 136 via the switch 194, here illustrated as a vacuum contactor, and a VSC choke 189. The switch (e.g., vacuum contactor) 194 may allow for galvanic isolation between the output terminals 196 when both the VI 190 and the switch 194 are open, and may accept an indication 225 to close.

In the illustrated example, the power electronics circuitry 192 includes a voltage source convertor (VSC) 198, a metal oxide varistor (MOV) 200, and a DC link capacitor 202. The VSC 198, as illustrated, includes a full bridge converter suitable for AC/DC power conversion, and may include, for example, insulated-gate bipolar transistors (IGBTs), metal-oxide-semiconductor field-effect transistors (MOSFETs), other reverse-conducting bidirectional switches, or other suitable power conversion components. The VSC 198 may be grounded to a ground terminal 219. As mentioned, when the VI 190 is opened in response to detection of an anomalous electrical condition by an IED, an arc may be formed between terminals of the VI 190. In response, the switch 194 may be closed, forming an electrical connection between the electrical power line 136 and the VSC 198. The VSC 198 may accept, as input, an output of a logical OR gate 195 that is based on downregulation indication 191 and a fault indication 193 that is inverted by the NOT gate 197 to determine a downregulation instruction. The VSC 198 may then extinguish the arc and subsequently drive the current in the electrical power line 136 to zero, completing the current interruption process along the electrical power line 136.

The VSC 198 may be supplied by the DC link capacitor 202, which may be charged by charging circuitry (not shown). The charging circuitry may be a low power rating, and may contribute small amounts (e.g., negligible) current while the VSC 198 is performing current interruption. The MOV 200, as illustrated, may be arranged in parallel with the DC link capacitor, and may activate to protect the DC link capacitor 202 and other components of the AC HCB 152 during the current interruption process. In particular, after the arc has been extinguished in the VI 190, the VSC may rapidly regulate the current along the electrical line 136 to zero. As a result, the DC link capacitor 202 may absorb a large amount of current. The MOV 200 may serve to dissipate energy that may otherwise charge the DC link capacitor 202 to a damagingly high voltage. The MOV 200 may also protect the DC link capacitor 202 from overvoltage conditions that may results from parasitic inductances in switches (e.g., the switch 194), the DC link capacitor 202, or other components of the AC HCB 152.

As illustrated, the DC link capacitor 202 may produce a measurable DC link capacitor current 199 via, for example, interfacing with an ammeter 201. Similarly, the MOV 200 may produce a measurable MOV current 203 via an ammeter 205, for instance. The VSC 198 may also output measurable electrical quantities. As illustrated, the VSC 198 may produce a VSC DC voltage 207 via a voltmeter 209, a VSC voltage 211 via a voltmeter 213, and a VSC current 215 via an ammeter 217, which may also be connected to the choke 189, for example. Further, the VI 190 may produce a measurable VI current 221 via an ammeter 223, which may also be connected to the output terminal 196.

The choke 189, as mentioned, may electrically couple the power electronics circuitry 192 and the electrical power line 136. The choke 189 may include a resistance component and/or an inductance component, as illustrated, and the resistance and/or inductance of the choke 189 may be substantially greater than the natural resistance and/or inductance of the mesh including the choke 189, the VI 190, the switch 194, and the VSC 198. As such, the choke 189 may limit a rate of change (e.g., rate of rise) of the current within the mesh, which may improve the ability of the VSC 198 to control the current within the mesh (e.g., regulate the current to zero). The choke 189 may include a relatively small, light inductor, such as an air-core inductor. Additionally, the inductance of the choke 189 may be relatively small (e.g., 1 microhenry), which may reduce an output voltage of the VSC 198 needed for current interruption.

Figure 4:
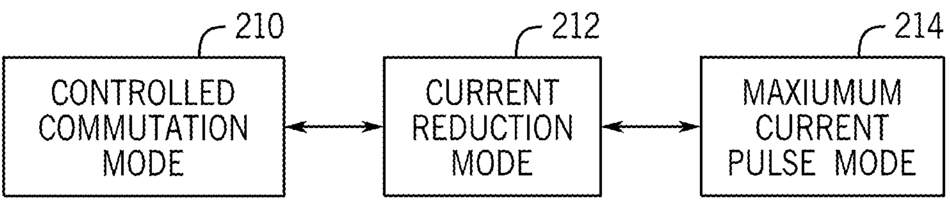
FIG. 4 is a block diagram of operating modes of the adaptive-commutation hybrid circuit breaker (AC HCB)

FIG. 4 illustrates an example of three operating modes that the AC HCB 152 may use for current interruption. In particular, the AC HCB 152 may operate under a controlled commutation mode (CCM) 210, a current reduction mode (CRM) 212, and a maximum current pulse mode (MCPM) 214 that may each define operating characteristics of the VSC 198. The controlled commutation mode 210 may be used in response to the detection of an anomalous electrical condition in which a fault current determined to be low, and may be used to extinguish an arc in the VI 190. In the CCM 210, the VSC 198 may regulate the current within the VI 190 to zero while keeping the rate of change of the current within the VI 190 relatively low, thereby allowing the VSC 198 to extinguish the arc within the VI 190.

The maximum current pulse mode 214 may be used in response to the detection of an anomalous electrical condition in which a fault current is determined to be high, and may, like the CCM 210, be used to extinguish the arc in the VI 190. The maximum current pulse mode 214 may allow large currents to be supplied, thereby allowing high fault currents to be interrupted by the power electronics circuitry 192. In the maximum current pulse mode 214, the DC link capacitor 202 may be entirely or almost entirely discharged, which may result in a relatively low rate of change of the current within the VI 190, thereby allowing the VSC 198 to extinguish the arc within the VI 190 and regulate the fault current to zero. The current reduction mode 212 may be implemented by the VSC 198 after the arc within the VI 190 is extinguished, and may serve to regulate a current of the VSC 198 to zero, which may allow a fault current (e.g., the current along the electrical power line 136) to be regulated to zero.

Figure 5:
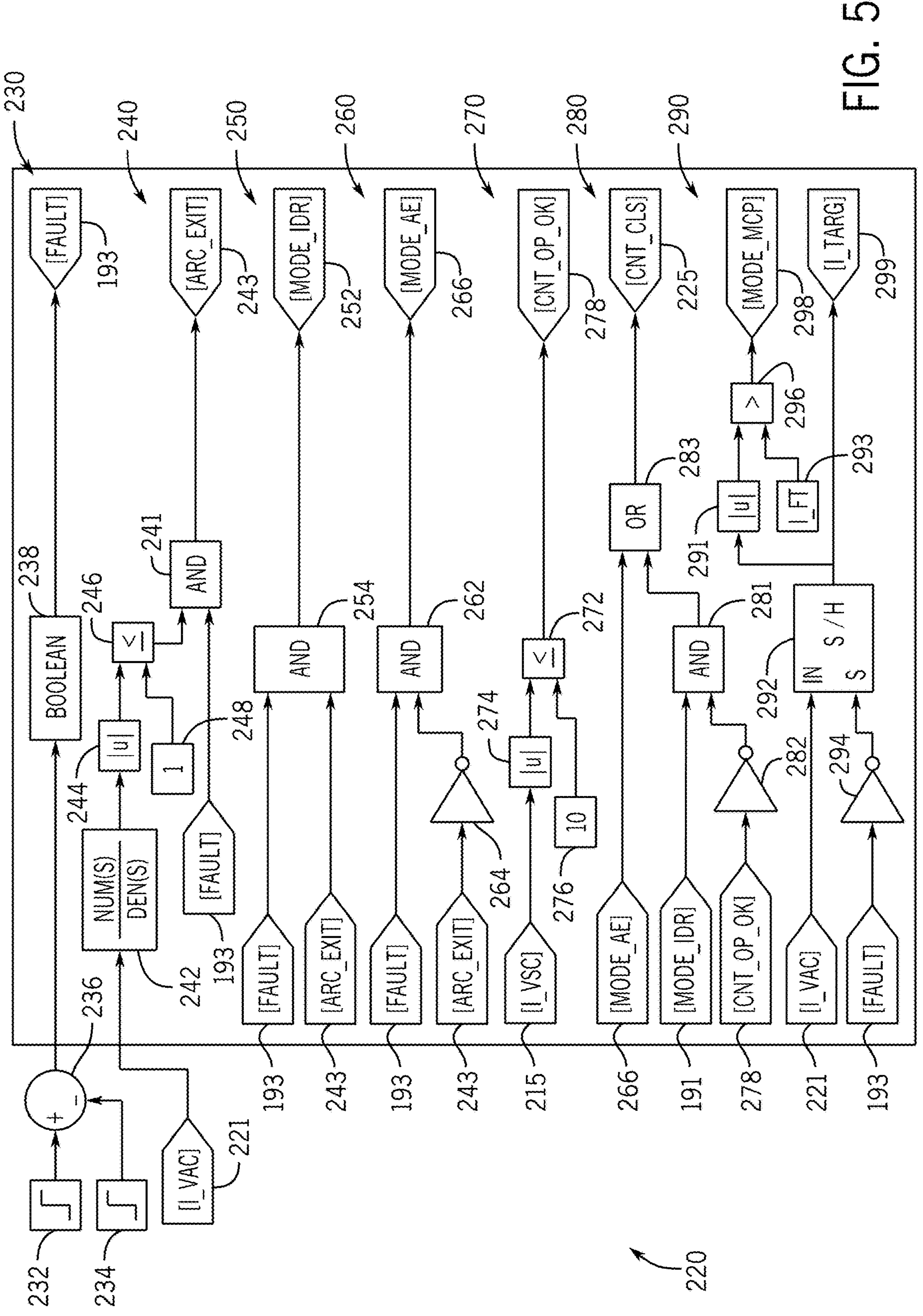
FIG. 5 is a schematic diagram of an example supervisory control scheme of the adaptive-commutation hybrid circuit breaker (AC HCB)

With the foregoing in mind, FIG. 5 illustrates an example of a supervisory control scheme 220 that may be implemented by the AC HCB 152, the IED 106, other suitable controllers, or a combination thereof to interrupt a current in response to detection of an anomalous electrical condition. It should be noted that the supervisory control scheme 220 includes mere examples of possible control logic to perform the techniques described herein, and the control schemes used in an AC HCB 152 may include other control logic, different control logic, and/or more complex control logic. Additionally, as will be described below, portions of the supervisory control scheme 220 may use outputs (e.g., determinations) produced by other portions as inputs. In some examples, the supervisory control scheme 220 may be implemented in software (e.g., as processor-executable instructions), and each portion of logic described below may be implemented as functions or other structures capable of calling one another.

As illustrated, the supervisory control logic 220 may include fault detection logic 230. The fault detection logic 230 may accept, as inputs, a first signal (e.g., waveform) 232 that indicates an anomalous electrical condition or fault condition and a second signal 234 not indicative of an anomalous electrical condition or fault condition (e.g., indicative of a fault being cleared). The first signal and the second signal may represent, for example, the tripping of a protective relay, and/or may be generated by protection algorithms implemented by a controller associated with the AC HCB (e.g., the IED 106). The fault detection logic may determine the detection of a fault based at least on the first signal and the second signal. For example, the first signal 232 and second signal 234 may be combined via a sum block 236, and the fault condition 193 may be determined via Boolean logic 238.

The supervisory control scheme 220 may also include arc extinguishment logic 240 that may determine whether an arc (e.g., within the VI 190) has been extinguished. The arc extinguishment logic 240 may accept, as input, a signal indicative of the VI current 221 and may determine a transfer function 242 of the VI current 221. An absolute value 244 of the transfer function 242 may be compared, at comparison block 246, to a constant 248. Additionally, the arc extinguishment logic may accept the determination of a fault 193 as input, and the determination of a fault 193 may be produced based on the fault detection logic 230. As may be appreciated, the detection of a fault may indicate that an arc may be present (e.g., within the VI 190) if not already extinguished. If a fault is determined and an output of the transfer function of the current input is below a threshold value, a determination may be made that the arc has been extinguished. For example, an output of the comparison block 246 and the fault indication 193 may be passed through a logical AND 241 to produce an arc extinguished indication 243.

Further, the supervisory control scheme 220 may include current downregulation mode logic 250. The current downregulation mode logic 250 may accept, as inputs, the fault indication 193 (e.g., as output by the fault detection logic 230) and the arc extinguished indication 243 (e.g., as output by the arc extinguishment logic 240). The current downregulation mode logic 250 may output a current downregulation mode indication 252 based on a logical AND 252 of the fault indication 193 and the arc extinguished indication 243. As may be appreciated, the output of the current downregulation mode logic 250 may indicate that a fault was detected, that a resulting arc was extinguished, and that a current should now be regulated (e.g., reduced to zero).

Additionally, the supervisory control scheme 220 may include arc extinction mode logic 260. The arc extinction mode logic 260 may, like the current downregulation mode logic 250, accept the fault indication 193 and the arc extinguished indication 243 as inputs. However, the arc extinction mode may, based on a logical AND 262 of the fault indication 193 and a logical NOT 264 of the arc extinguished indication 143, output an arc extinction indication 266, which may correspond to, for example, the controlled commutation mode 210 or the maximum current pulse mode 214 of FIG. 4. As may be appreciated, if a fault is detected and an arc has not yet been extinguished, the arc extinction indication 266 may be output by the arc extinction mode logic 260.

The supervisory control scheme 220 may also include VSC contactor open logic 270. The VSC contactor open logic 270 may accept, as input, the VSC current 215. The VSC contactor open logic 270 may include a comparison block 272 that compares an absolute value 274 of the VSC current 215 to a threshold value 276, and the comparison block 272 may produce an VSC contactor open indication 278 indicative of whether it is acceptable (e.g., within safe operating parameters) to open a VSC contactor of the VSC 198. It should be noted that the threshold value 276 illustrated as part of the VSC contactor open logic 270 serves merely illustrative purposes. Indeed, the threshold values illustrated in FIG. may be any suitable value or unit, and may, in some examples, be alterable by, for example, an operator via a user interface associated with the AC HCB 152 as needed.

Even further, the supervisory control scheme 220 may include VSC contactor close logic 280. The VSC contactor control logic 280 may accept, as inputs, the arc extinction indication 266 (e.g., as output by the arc extinction mode logic 260) the downregulation mode indication 191 (e.g., as output by the current downregulation mode logic 250), and the VSC contactor open indication 278 (e.g., as output by the VSC contactor open logic 270). The VSC contactor close logic 280 may include a logical AND 281 of the downregulation mode indication 191 and a logical NOT 282 of the VSC contactor open indication 278. The VSC contactor close logic 280 may produce the close contactor indication 225 based on a logical OR 283 of the logical AND 281. As illustrated, if an indication or instruction to enter an arc extinction mode is input, an indication or instruction to close a VSC contactor of the VSC 198 is output by the VSC contactor close logic 280. Additionally, if an indication to enter a current downregulation mode is input or an indication that it is acceptable to open a VSC contactor is not input, the indication or instruction to close a VSC contactor of the VSC 198 is output by the VSC contactor close logic 280.

Finally, the supervisory control scheme may include maximum current pulse mode (MCPM) logic 290. The MCPM logic 290 may accept, as inputs, the VAC current 221 and an the fault indication 193 (e.g., as output by the fault detection logic 230). The MCPM logic 290 may include a sample and hold operation 292 that samples the VAC current 221 when triggered by the inverse 294 of the fault indication 193. An absolute value 291 of the output of the sample and hold operation 292 may be compared, in a comparison block 296, to a threshold value 293 to produce a maximum current pulse mode indication 298. For example, when a fault has not been detected, the current through the VI 190 may be sampled. After being sampled as part of the sample and hold operation, the current through the VI 190 may be compared to a threshold and, based on the comparison, an indication 298 or instruction to enter the maximum current pulse mode 214 may be output by the MCPM logic 290. In addition, the MCPM logic 290 may output a target current value 299 of the VI 190 based on the current through the VI 190 as sampled by the sample and hold operation.

Figure 6:
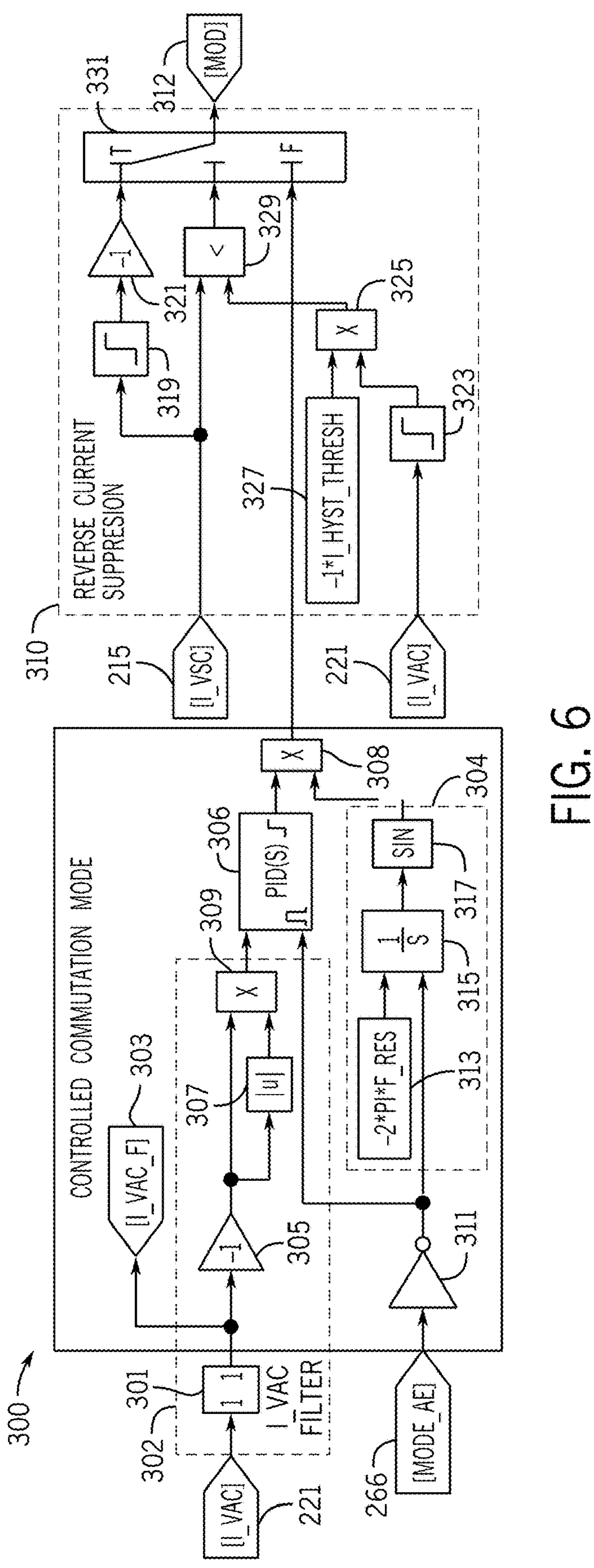
FIG. 6 is a schematic diagram of an example control scheme of an operating mode of the adaptive-commutation hybrid circuit breaker (AC HCB)

Moving on, FIG. 6 illustrates a diagram of an exemplary control scheme 300 for the controlled commutation mode 210. The CCM control scheme 300 may accept, as inputs, the VI current 221 and the arc extinction indication 266 (e.g., as output by the arc extinction mode logic 260 of FIG. 5), respectively. The CCM control scheme 300 may apply a signed-square function 302 to the current through the VI 190, and may supply the output of the signed-square function 302, along with the inverse of the indication or instruction to enter an arc extinction mode, to a proportional-integral-derivative (PID) controller 306. The signed-square function 302 may include, as illustrated, passing the VI current 221 through a filter 301 to produce a VI filter current 303. A gain operation 305 may be applied to the VI filter current 303. The output of the gain operation 305 may be multiplied, in multiplication block 309, by an absolute value 307 of the VI filter current 303 to produce an input to the PID controller 306. As described herein, the PID controller 306 may be used to regulate a frequency with which the VSC 198 changes. Further, the output of the signed-square function 302 may produce a signal (e.g., control signal) proportional to the energy needed by the VSC 198 to interrupt a current and may thus allow the PID controller 306 to perform well across a wide range of currents. As described herein, the PID controller 306 may be included as part of the AC HCB 152, the IED 106, or other device in communicative connection with the AC HCB 152.

The CCM control scheme 300 may also include wave generation logic 304 that may generate a sinusoid with a chosen resonant frequency. The chosen resonant frequency may, for example, be input by an operator via a user interface in communicative connection with the PID controller 306, the IED 106, the AC HCB 152, or the like. Additionally, the wave generation logic 304 may accept, as input, the arc extinction indication 266 that may be inverted by an inverter 311. The inverted arc extinction indication may, along with a waveform 313 with the chosen resonant frequency, be input to an integrator 315. The output of the integrator 315 may be multiplied by sine wave 317 to generate a sinusoid. The generated sinusoid, when combined with an output of the PID controller 306 at block 308, may modulate the generated sinusoid to produce a waveform that includes a train of relatively smooth current pulses. Additionally, the waveform may include zero-crossings (e.g., current values of 0) at which current may be interrupted, may include rates of change optimal for interrupting current, and may demand less capacitance from the DC link capacitor 202.

The current waveform generated at block 308 may be used as input to the reverse current suppression logic 310 to perform a pulse-width modulation (PWM) function, and the PWM function may produce control signal 312 used to switch the VSC 198. For example, the control signal 312 may define an optimal rate of change for the current through the VI 190 and/or the current through the VSC 198 such that a current interruption process of the AC HCB 152 may be performed more quickly and reliably. In addition to the current waveform generated at block 308, the reverse current suppression logic 310 accepts, as inputs, the VSC current 215 and the VI current 221.

The reverse current suppression logic 310, as illustrated, includes an asymmetrical hysteresis control. As illustrated, the VSC current 215 may be squared in block 319 and delayed in block 321. A squared version 323 of the VI current 221 may be multiplied, in block 325, with a hysteresis signal 327, and the multiplied output may be compared to the VSC current at the comparator 329. The output of the comparator 329, the output of the multiplication block 308, and the output of the delay 321 may be input to a PWM block 331 to produce a control signal 312 used to switch the VSC 198. The described asymmetrical hysteresis control may suppress currents of the VSC 198 that do not reduce the current through the VI 190. As such, use of the energy stored in the DC link capacitor 152 may be used more efficiently.

Figure 7:
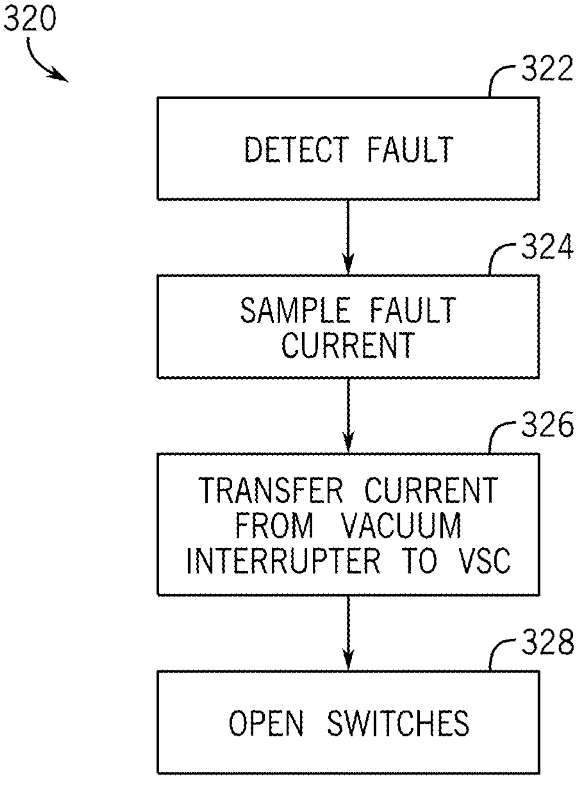
FIG. 7 is a flow chart of a method for interrupting a fault current in response to detection of a fault of the electric power delivery system using the adaptive-commutation hybrid circuit breaker (AC HCB)

FIG. 7 illustrates a flow diagram of a method 310 for interrupting a current in response to detecting an anomalous electrical condition, and may be described with reference to the preceding figures. The method may begin, in block 320, with the detection of a fault, such as an overcurrent condition or other anomalous electrical condition. The fault may be detected by the IED 106, the central IED 170, the computing device 178, the PID controller 306, or another controller associated with the AC HCB 152, and may be detected using algorithms, control structures and the like, as described herein. The fault may be detected based on, for example, sensor data from sensors arranged on the electrical power line 136 of FIGS. 1-3, at the electromechanical device 190 of FIGS. 1-3, at the load 140 of FIG. 1, or at other locations suitable for detecting electrical conditions of the electrical power line 136. In an example, the IED 106 may compare a current value included in received sensor data to an overcurrent threshold value and, based on the comparison, determine an overcurrent fault. A fault may also be detected based on control instructions, indications, and so on generated by components of the electric power distribution system 100 of FIG. 1, such as relays and the like.

In block 324, the current along the electrical line 136 may be sampled by the AC HCB 152. The AC HCB 152 may, based on the sampled current, determine control functions to be used to interrupt the current along the electrical line 136. The AC HCB 152 may compare the sampled current value to a current threshold value (e.g., a maximum current value) and, based on the comparison, may determine whether to implement a current-commutation mode or a maximum current pulse mode, as described herein. For example, the AC HCB 152 may implement maximum current pulse mode when the sampled current value is greater than 85 percent of the current threshold value, such that the maximum current pulse mode is used for faults that mostly discharge the capacitance of the DC link capacitor 202. This may result in a lower rate of change of the fault current, which may ease current interruption at zero-crossings of the fault current. If, on the other hand, the sampled current value is less than 85 percent of the threshold current value, the AC HCB 152 may implement the current-commutation mode, in which a PWM function reduces the rate of change of the fault current. It should be noted that 85 percent is used as an exemplary value by which to compare the sampled current and the current threshold value and, in other examples, different percentages, thresholds, and so on may be used by the AC HCB 152 to determine whether to use CCM or MCPM.

In block 326, the AC HCB 152 transfers current along the electrical power line 136 to the power electronics circuitry 192. As described herein, the AC HCB 152 may perform block 326 by, for example, opening the VI 190 and closing the switch 194, such that current along the electric power line 136 may flow to the power electronics circuitry 192. In particular, closing the switch 194, which may include a vacuum contactor, may allow the VSC 198 to extinguish an arc formed within the VI 190 and regulate the fault current towards zero, interrupting current flow along the electric power line 136. The VSC 198 may extinguish the arc within the VI 190 and/or regulate the fault current towards zero based on, for example, the controlled commutation mode 210, the current reduction mode 212, or the maximum current pulse mode 214, as described herein.

In block 328, the AC HCB 152 may open (e.g., turn off) one or more switches, such as switches included as part of the VSC 198 or the switch 194. The AC HCB 152 may implement block 328 by, for example, disabling gate controls of the VSC 198, which may cause switches of the VSC 198 to open. Remaining fault current of the AC HCB 152 may then flow through the anti-parallel diodes of the VSC 198 and into the DC link capacitor 202, which may cause the DC link capacitor to charge. Further, the MOV 200 may dissipate remaining excess energy, completing the current interruption process. The AC HCB 152 may then close the VI 190 to allow current to flow along the electric power line 136 to resume normal operation.

Figure 8A:
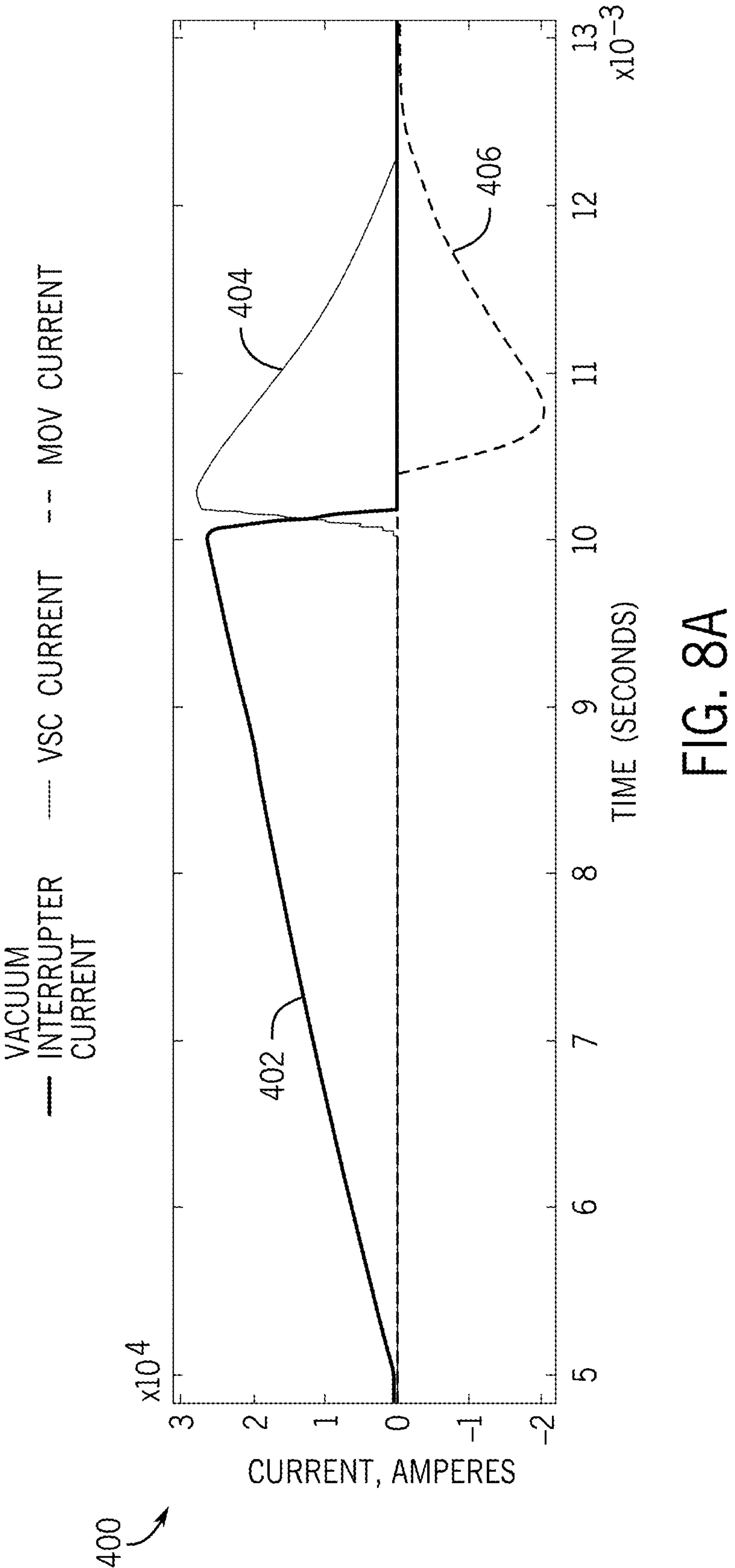
FIGS. 8A and 8B illustrate plots of electrical characteristics of the adaptive-commutation hybrid circuit breaker (AC HCB) when operating according to a current-commutation mode.
Figure 8B:
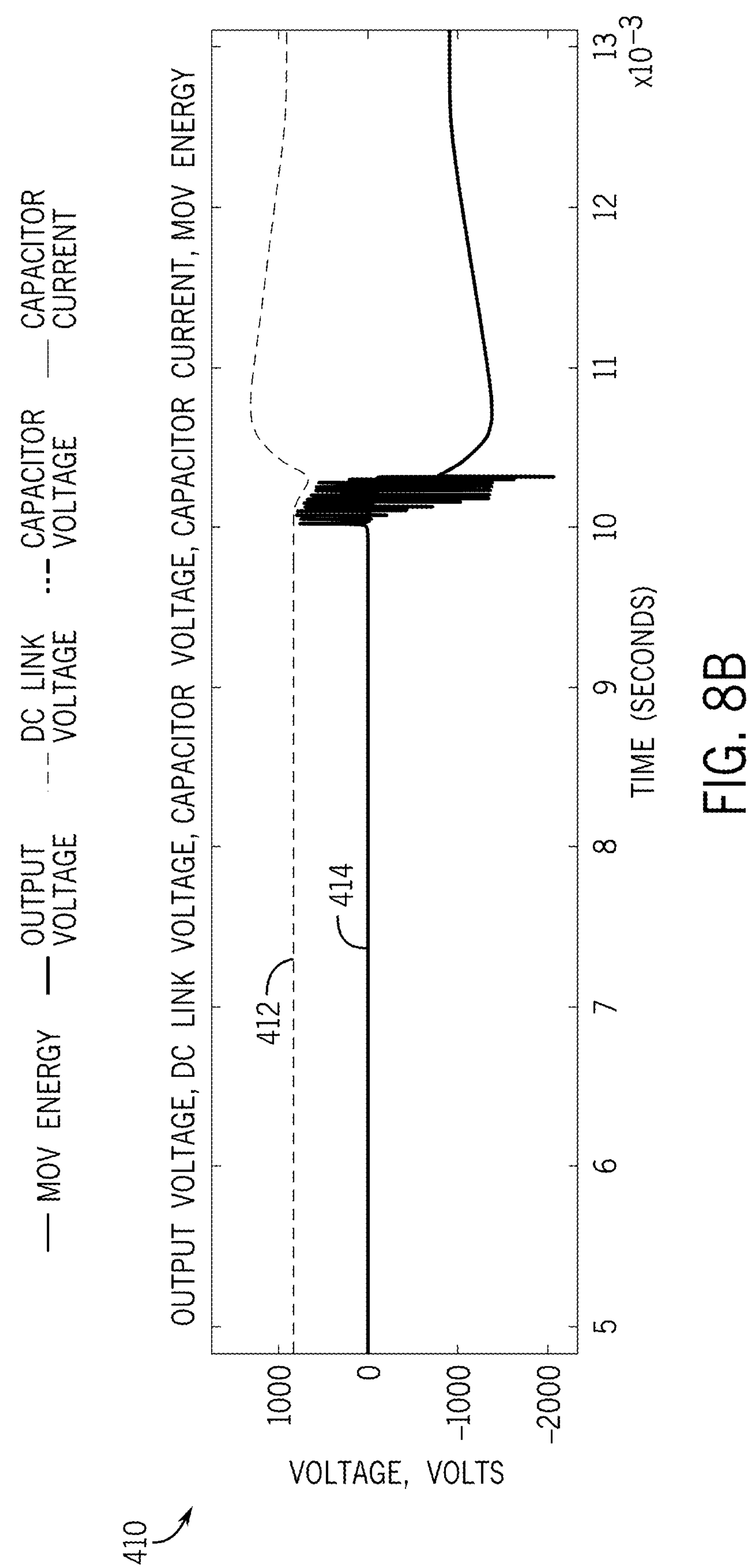

FIGS. 8A and 8B illustrate example plots 400 and 410 of electrical values of the AC HCB 152 throughout a current interruption process using the current-commutation mode of control. In particular, the plot 400 shows a VI current 402 (e.g., through the vacuum interrupter 190), a VSC current 404 (e.g., through the VSC 198), and a MOV current 406 (e.g., through the MOV 200) over time (in milliseconds). In the illustrated example, a fault (e.g., an anomalous electrical condition) has been detected (e.g., along the electrical line 136 of FIGS. 1-3), and the VI current 422 may be around 26 kiloamperes. In response, the VI 190 is opened current-commutation mode is activated by the AC HCB 152 at 10 milliseconds. Over the next roughly 150 microseconds, the VSC current 404 rises to the value of the VI current 402 when the fault was detected, and the VI current 402 is reduced to zero. In the illustrated example, the rate of change of the VI current 402 is around 500 amps per microsecond. However, this rate of change may be adjusted by altering CCM control parameters. For example, if the rate of change is determined as being too high for effective arc extinction, the rate of change may be decreased by lowering CCM control gains. As illustrated, transients related to PWM control may be present with the decrease in the VI current 402 and with the increase in the VSC current 404.

When the VI current 402 reaches zero, the AC HCB 152 may transition to the current reduction mode. As described herein, the CRM may include turning off one or more switches of the AC HCB 152, which may cause remaining fault current to be commutated to anti-parallel diodes. As illustrated in the plot 410, the DC link voltage 412 (e.g., the voltage across the DC link capacitor 202) may increase and, in response, the MOV 202 may begin conducting to limit the increase in voltage. Concurrently, the output voltage 414 may oscillate rapidly as a function of the PWM control of the AC HCB 152 in current reduction mode. In the illustrated example, the total interruption time of the AC HCB 152 is around 3 milliseconds, and the MOV 202 may dissipate around 26.8 kilojoules of energy.

Figure 9A:
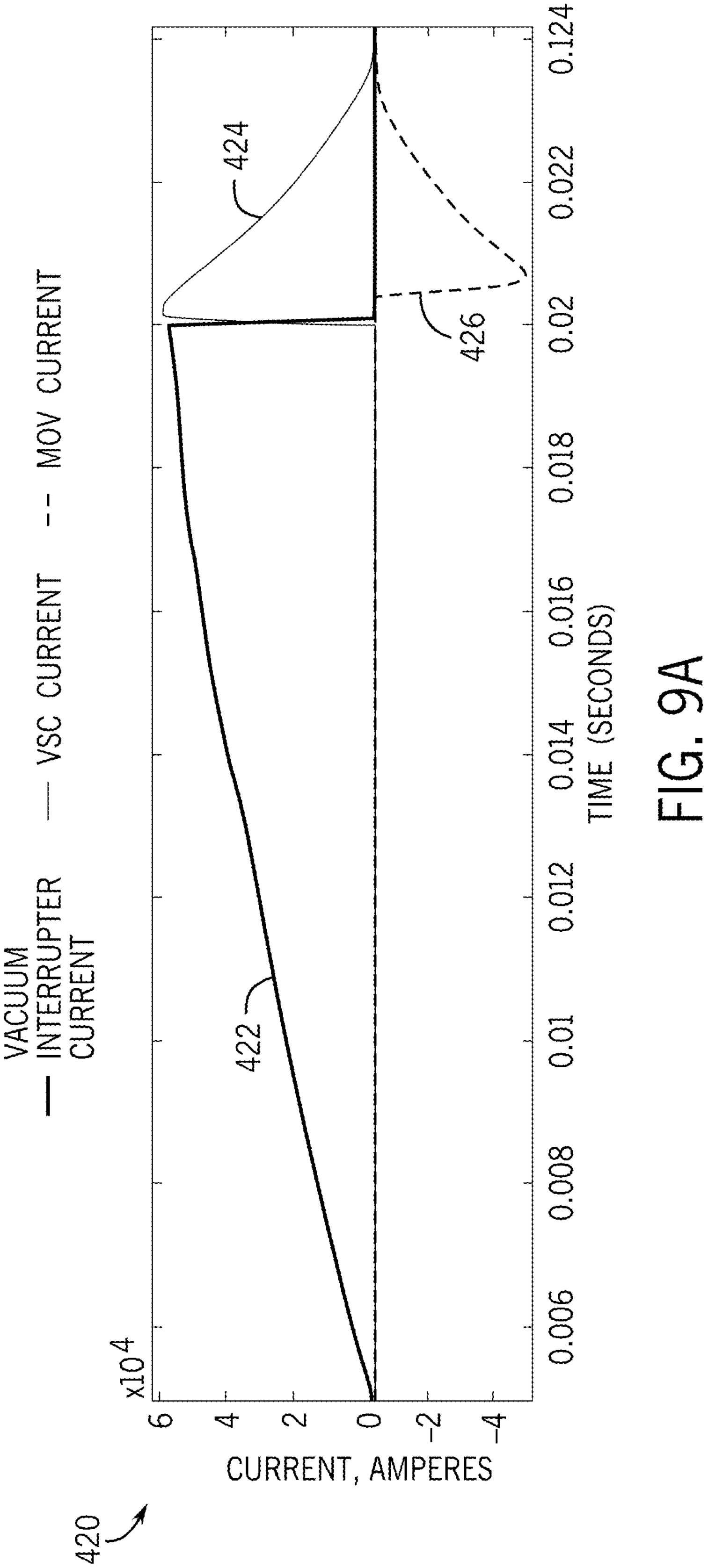
FIGS. 9A and 9B illustrate plots of electrical characteristics of the adaptive-commutation hybrid circuit breaker (AC HCB) when operating according to a maximum current pulse mode.
Figure 9B:
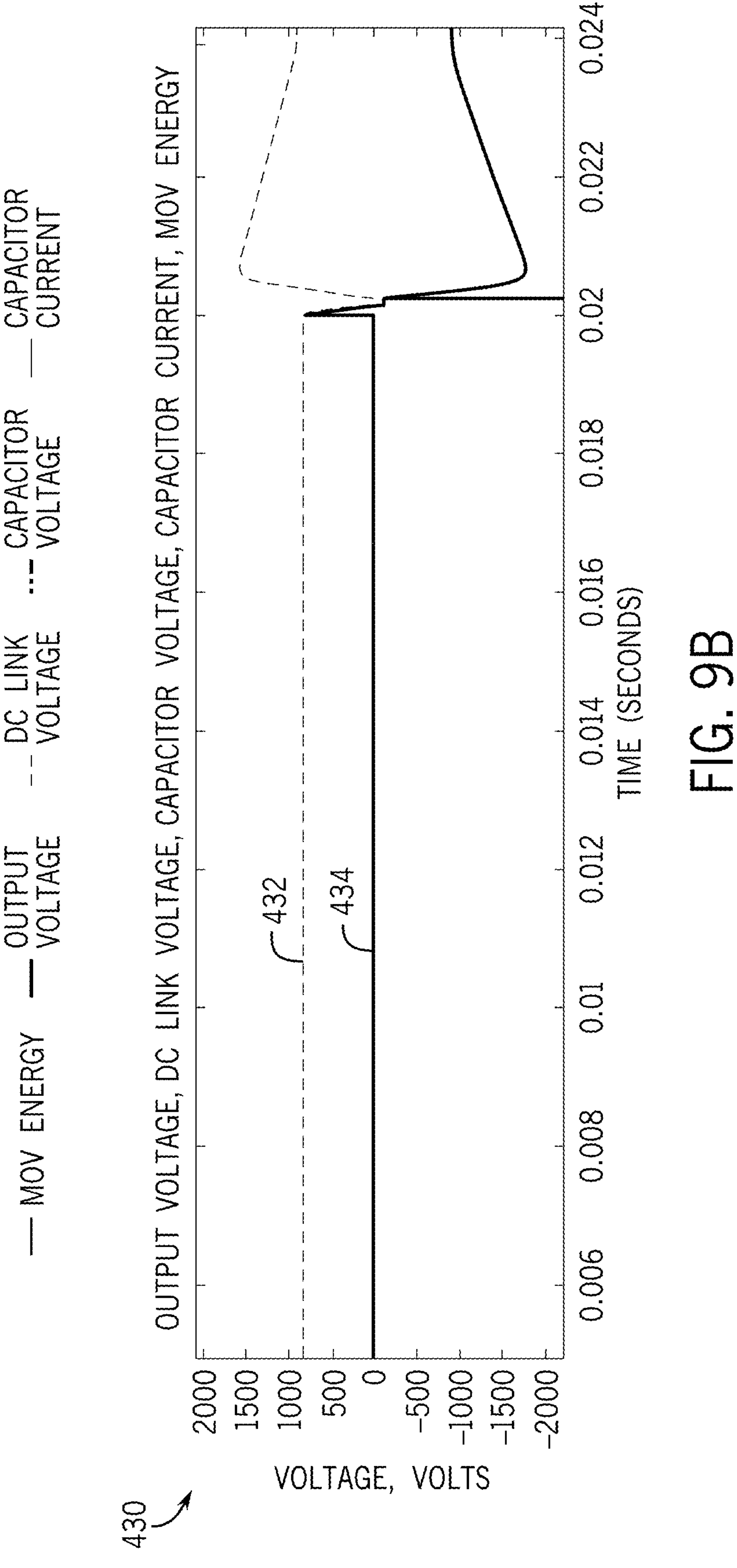

FIGS. 9A and 9B illustrate example plots 420 and 430 of electrical values of the AC HCB 152 throughout a current interruption process using the maximum current pulse mode of control. As described herein, upon detection of an anomalous electrical condition, the AC HCB 152 samples a fault current (e.g., current though the VI 190) and determines whether the CMM or MCPM should be used. In the illustrated example, the MCPM is used in response to determining that the fault current is greater than 85 percent of a threshold current value. The MCPM may be used for fault currents higher than those that the CCM is used for, resulting in the DC link capacitor mostly discharging and a low fault current rate of change at zero-crossings of the fault current. As illustrated, when the MCPM is activated, the VI current 422 is regulated to zero and the VSC current 424 rises to a value proximate to the VI current 422 prior to activation of the MCPM mode. Additionally, the VI current 422 and VSC current 424, along with output voltage 434 and DC link voltage 432 of the plot 430, are absent the PWM-related transients present in FIG. 8 (e.g., the current commutation mode). In the illustrated example, the rate of change of the VI current 422 may be relatively low (e.g., around 85 amps per microsecond), which may be advantageous in achieving arc extinction.

In the illustrated example, the VI current 422 at the time of fault may be around 58 kiloamperes, and the MOV 200 may dissipate around 102 kilojoules of energy. When compared with the fault current and MOV energy dissipation of the CCM implementation in illustrated in FIG. 8 (26 kiloamperes and 38 kilojoules, respectively), it may be observed that by roughly doubling the fault current, the MOV energy dissipation has roughly quadrupled. The relationship of fault current to MOV energy dissipation may be quadratic because the energy stored in the AC HCB 152 inductance may increase quadratically with current. As such, a system with faster current interruption may require less MOV energy dissipation and may thus increase a durability (e.g., a lifespan) of the MOV 200.

Figure 10A:
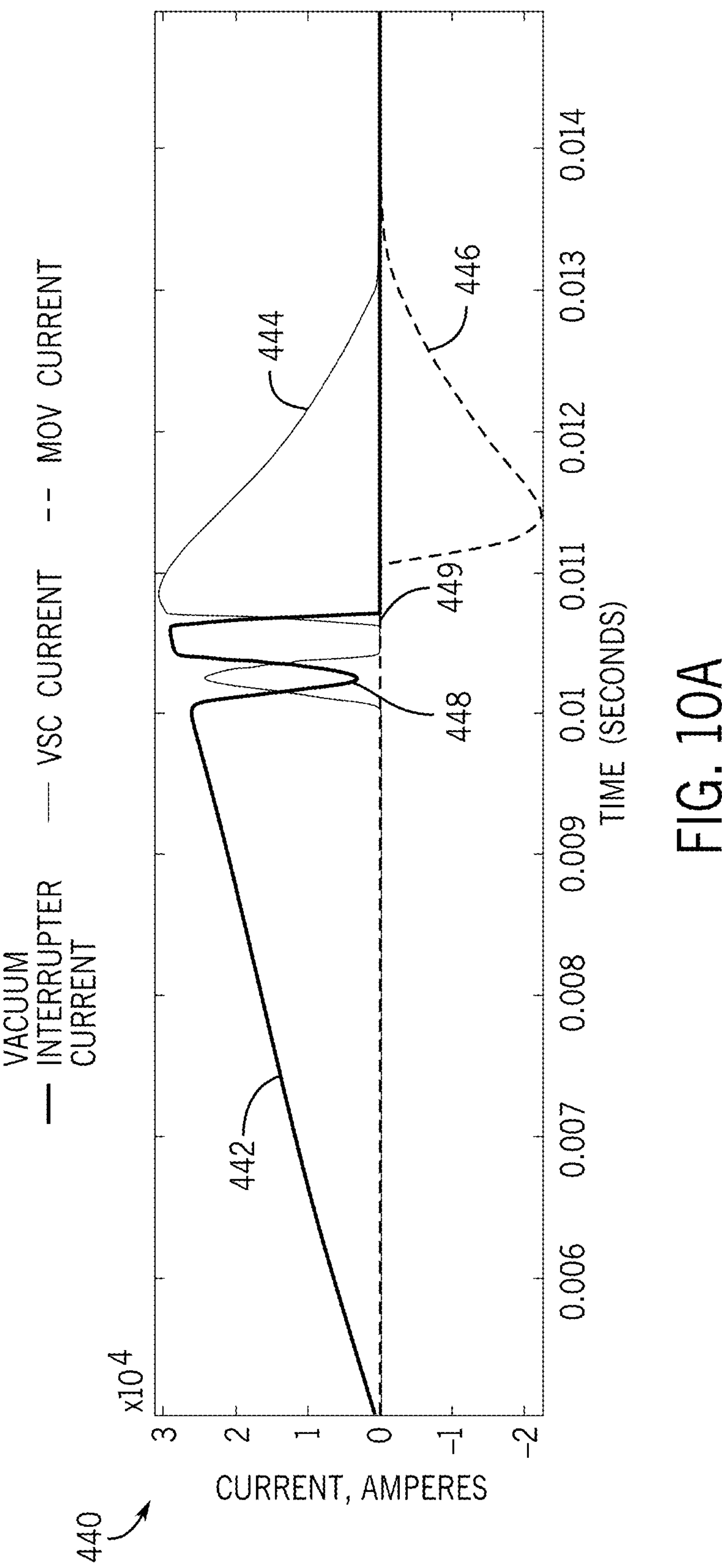
FIGS. 10A and 10B illustrate plots of electrical characteristics of the adaptive-commutation hybrid circuit breaker (AC HCB) when operating according to a current-commutation mode, in which reverse current suppression is used.
Figure 10B:
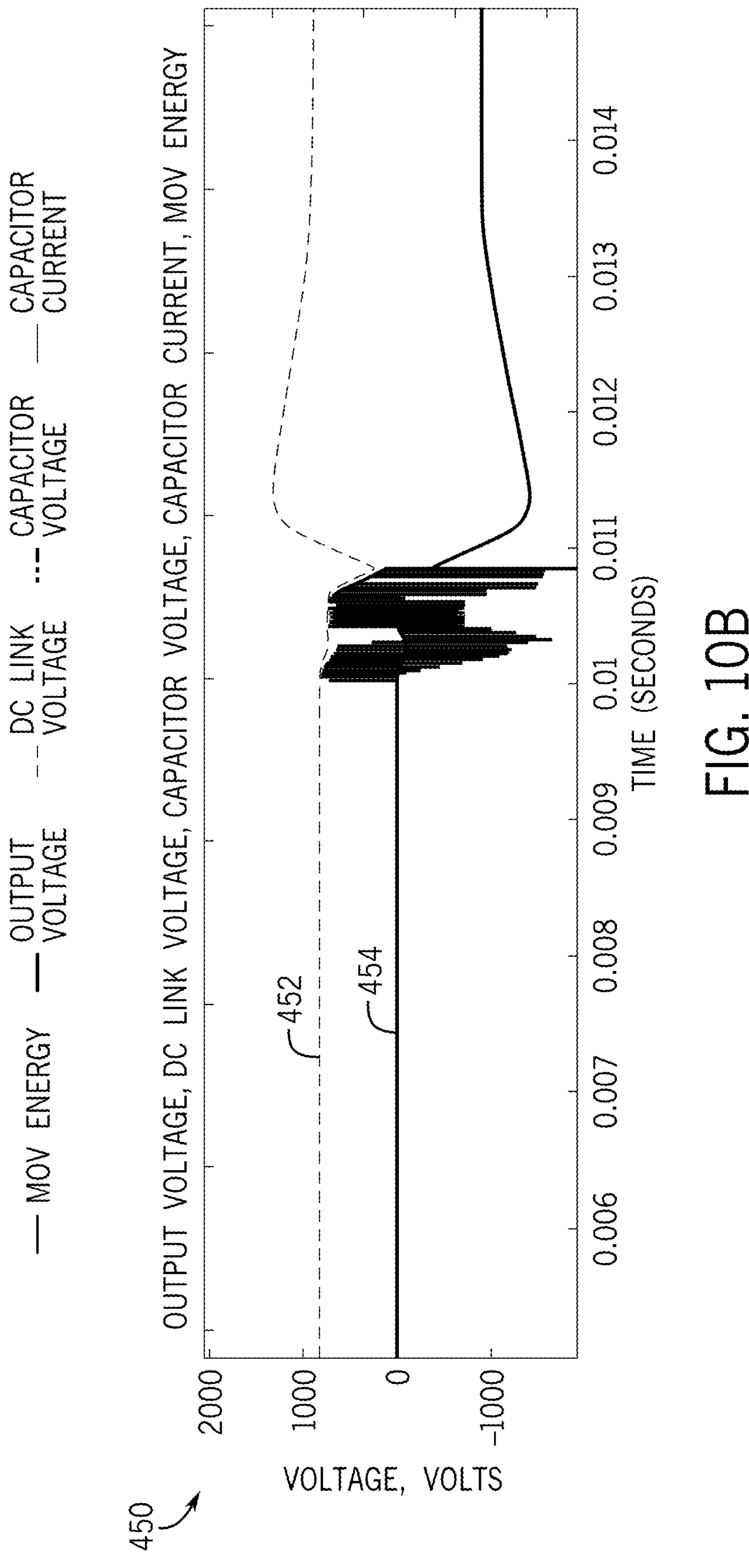

FIGS. 10A and 10B illustrate example plots 440 and 450 of electrical values of the AC HCB 152 throughout a current interruption process using the current-commutation mode of control, in which reverse current suppression logic (e.g., the reverse current suppression logic of FIG. 6) aides in current interruption. In the illustrated example, a fault been detected and, in response, the VI 190 is opened current-commutation mode is activated by the AC HCB 152 at 10 milliseconds. As a result, the VI current 442 (e.g., the fault current) initially decreases towards zero and the VSC current 444 initially increases. However, the VI current 442 does not cross zero initially (e.g., at the first minima 448), and begins to increase subsequently. The VI current 442 may not cross zero initially because of, for example, an arc remaining present in the VI 190 or parameters of the PID controller 306.

The reverse current suppression logic may alter subsequent waves of the VI current 442 such that the next minima 449 of the VI current 449 provides a zero-crossing that allows for current interruption, as illustrated. Without the reverse current suppression logic, achieving a zero-crossing in subsequent waves, and thus interrupting a fault current, may be more challenging. In the illustrated example, PWM transients may be observed in the VI current 442, the VSC current 444, as well as in output voltage 454 of the plt 450. Also illustrated in the plot 450, the DC link voltage 452 (e.g., the voltage across the DC link capacitor 202) may increase and, in response, the MOV 202 may begin conducting to limit the increase in voltage.

While specific embodiments and applications of the disclosure have been illustrated and described, it is to be noted that the disclosure is not limited to the precise configurations and devices disclosed herein. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be noted that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A current interruption system, comprising:

an electromechanical switch coupling an electrical source and an electrical load along an electrical line of a power delivery system;

a controller configured to:

receive an indication of an electrical characteristic along the electrical line;

determine a fault condition based on the electrical characteristic; and based on the determination of the fault condition, transmit instructions to interrupt a first current through the electromechanical switch;

according to a first mode based on the electrical characteristic indicating a sampled current value being below a threshold value; and according to a second mode based on the electrical characteristic indicating the sampled current value being equal to or above the threshold value; and a voltage source converter (VSC) configured to:

receive the instructions from the controller;

interrupt the first current according to the first mode or the second mode; and reduce a second current through the VSC to zero.

2. The current interruption system of claim 1, wherein the fault condition comprises an overcurrent condition along the electrical line of the power delivery system.

3. The current interruption system of claim 1, wherein the controller comprises an intelligent electronic device (IED).

4. The current interruption system of claim 1, wherein the instructions to interrupt the first current through the electromechanical switch according to the first mode comprise a target rate-of-change of the first current through the electromechanical switch, wherein the target rate-of-change of the first current through the electromechanical switch is based on a target rate-of-change of the second current through the VSC.

5. The current interruption system of claim 4, wherein the target rate-of-change of the second current through the VSC is defined by a pulse-width modulation (PWM) function of the instructions to interrupt a first current through the electromechanical switch according to the first mode.

6. The current interruption system of claim 1, wherein the VSC is electrically coupled to the electrical line of the power delivery system via a vacuum contactor.

7. The current interruption system of claim 6, wherein the controller is configured to send instructions to the vacuum contactor to close based on the determination of the fault condition.

8. The current interruption system of claim 1, wherein:

the first mode comprises a controlled commutation mode; or the second mode comprises a maximum current pulse mode; or the first mode comprises a controlled commutation mode and the second mode comprises a maximum current pulse mode.

9. A method, comprising:

receiving instructions to interrupt a first current through an electromechanical switch along an electrical line of a power delivery system according to a first mode or a second mode;

instructing a second switch to electrically couple an uncoupled voltage source convertor (VSC) to the electrical line;

regulating, via the VSC, the first current through the electromechanical switch to zero according to the first mode or the second mode;

instructing the second switch to electrically decouple the VSC from the electrical line in response to the first current through electromechanical switch being regulated to zero;

regulating, via one or more capacitors, a second current through the VSC to zero in response to the VSC being decoupled from the electrical line.

10. The method of claim 9, wherein the second current through the VSC being regulated to zero comprises the second current being dissipated by a capacitor electrically coupled to the VSC.

11. The method of claim 9, wherein the first mode is indicative of a fault current through the electromechanical switch being below a threshold and the second mode is indicative of the fault current through the electromechanical switch being above the threshold.

12. The method of claim 9, wherein regulating the first current through the electromechanical switch to zero according to the first mode comprises decreasing the first current by increasing the second current.

13. The method of claim 9, wherein regulating the first current through the electromechanical switch to zero according to the second mode comprises decreasing the first current by increasing the second current according to a pulse-width modulation (PWM) control scheme.

14. The method of claim 10, comprising:

receiving one or more parameters of a pulse-width modulation (PWM) scheme from a controller, wherein the one or more parameters define a rate of change of the regulation of the first current.

15. A non-transitory computer-readable medium comprising computer-executable instructions that, when executed, are configured to cause data processing circuitry to perform operations comprising:

receiving a signal indicative of one or more electrical characteristics of an electrical line of a power delivery system;

determining a fault condition based on the one or more electrical characteristics;

transmitting first instructions or second instructions to a circuit breaker coupled to the electrical line of the power delivery system to cause the circuit breaker to:

reduce a first current along the electrical line by coupling an uncoupled voltage source converter (VSC) to the electrical line;

decouple the VSC from the electrical line in response to the first current being reduced to zero; and reduce a second current through the VSC to zero via one or more capacitors coupled to the VSC.

16. The non-transitory computer-readable medium comprising computer-executable instructions of claim 15, wherein reducing the first current comprises redirecting the first current through the VSC.

17. The non-transitory computer-readable medium comprising computer-executable instructions of claim 15, wherein the first instructions cause the circuit breaker to reduce the first current along the electrical line according to a pulse-width modulation (PWM) scheme.

18. The non-transitory computer-readable medium comprising computer-executable instructions of claim 15, wherein the electrical line is configured to couple an electrical source to an electrical load.

19. The non-transitory computer-readable medium comprising computer-executable instructions of claim 15, wherein coupling the VSC to the electrical line comprises closing a vacuum contactor, and wherein decoupling the VSC from the electrical line comprises opening the vacuum contactor.

20. The non-transitory computer-readable medium comprising computer-executable instructions of claim 15, wherein:

the first instructions are sent based on a sampled current value being below a threshold value and the first instructions cause the VSC to operate in a controlled commutation mode; and the second instructions are sent based on the sampled current value being above a threshold value and the second instructions cause the VSC to operate in a maximum current pulse mode.

* * * * *